United States Patent [19]

Wuest et al.

[11] Patent Number: 5,308,987
[45] Date of Patent: May 3, 1994

[54] MICROGAP X-RAY DETECTOR

[75] Inventors: Craig R. Wuest, Danville; Richard M. Bionta; Elden Ables, both of Livermore, all of Calif.

[73] Assignee: The United States of America as represented by the United States Department of Energy, Washington, D.C.

[21] Appl. No.: 11,637

[22] Filed: Feb. 1, 1993

[51] Int. Cl.⁵ .............................................. H01J 47/10
[52] U.S. Cl. .................. 250/374; 250/385.2
[58] Field of Search .............................. 250/374, 385.2

[56] References Cited

U.S. PATENT DOCUMENTS

| | | | |
|---|---|---|---|
| 4,431,921 | 2/1984 | Filthuth | 250/374 |
| 4,686,368 | 8/1987 | Anderson et al. | 250/374 |
| 4,859,855 | 8/1989 | Vlasbloem | 250/385.1 |
| 4,896,041 | 1/1990 | Vlasbloem et al. | 250/385.1 |
| 4,999,500 | 3/1991 | Breskin et al. | 250/385.1 |
| 5,032,729 | 7/1991 | Charpak | 250/385.1 |
| 5,115,134 | 5/1992 | Slowey | 250/374 |
| 5,192,861 | 3/1993 | Breskin et al. | 250/214 VT |

OTHER PUBLICATIONS

A. Peisert and F. Sauli, "A Two-Dimensional Parallel-Plate Chamber for High-Rate Soft X-Ray Detector." *Nuclear Instruments and Methods In Physics Research A*, vol. 127 (Jul. 1, 1986) pp. 453-459.
R. Bellazzini, C. Betti, A. Brez, E. Carboni, M. M. Massai and M. R. Torquati, "A Novel Type of Parallel Plate Chamber with Resistive Germanium Anode and a Two-Dimensional Readout." *Nuclear Instruments and Methods In Physics Research A*, vol. 127 (Jul. 1, 1986) pp. 445-452.
UCRL-JC-105645, "An Electro-Optical Imaging Approach to the Prompt Signal Processing Problem of Mega-Channel SSC Detector Arrays," M. Lowry et al., Oct. 15-18, 1990.
UCRL-JC-107396-REV. 1, "Observation of Drift Chamber Signals Using A Mach-Zehnder Electro-Optic Modulator," E. Ables, et al., Jul. 1, 1991.

*Primary Examiner*—Constantine Hannaher
*Attorney, Agent, or Firm*—Henry Sartorio; Roger S. Gaither; William R. Moser

[57] ABSTRACT

An x-ray detector which provides for the conversion of x-ray photons into photoelectrons and subsequent amplification of these photoelectrons through the generation of electron avalanches in a thin gas-filled region subject to a high electric potential. The detector comprises a cathode (photocathode) and an anode separated by the thin, gas-filled region. The cathode may comprise a substrate, such a beryllium, coated with a layer of high atomic number material, such as gold, while the anode can be a single conducting plane of material, such as gold, or a plane of resistive material, such as chromium/silicon monoxide, or multiple areas of conductive or resistive material, mounted on a substrate composed of glass, plastic or ceramic. The charge collected from each electron avalanche by the anode is passed through processing electronics to a point of use, such as an oscilloscope.

27 Claims, 2 Drawing Sheets

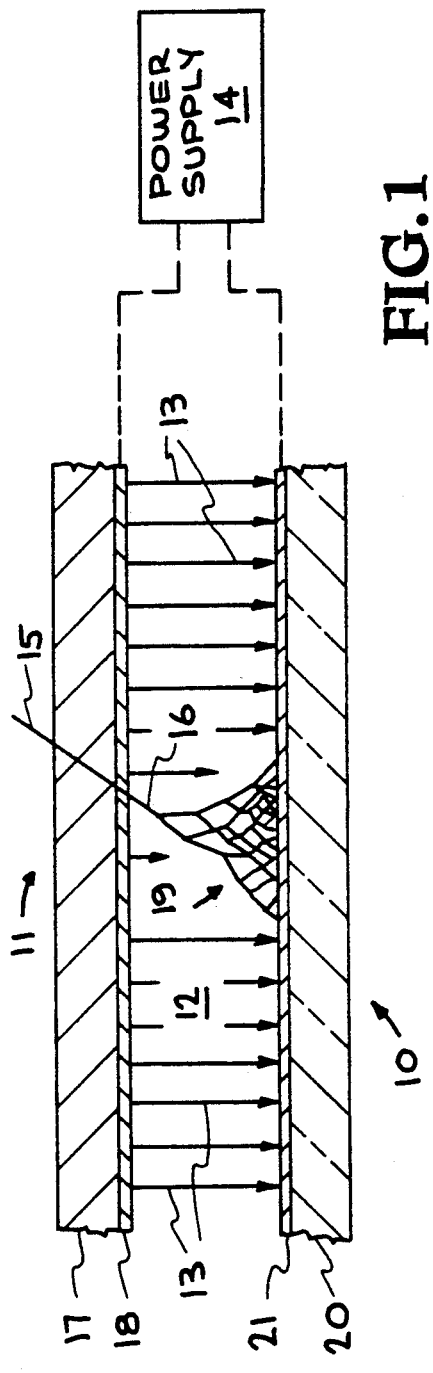
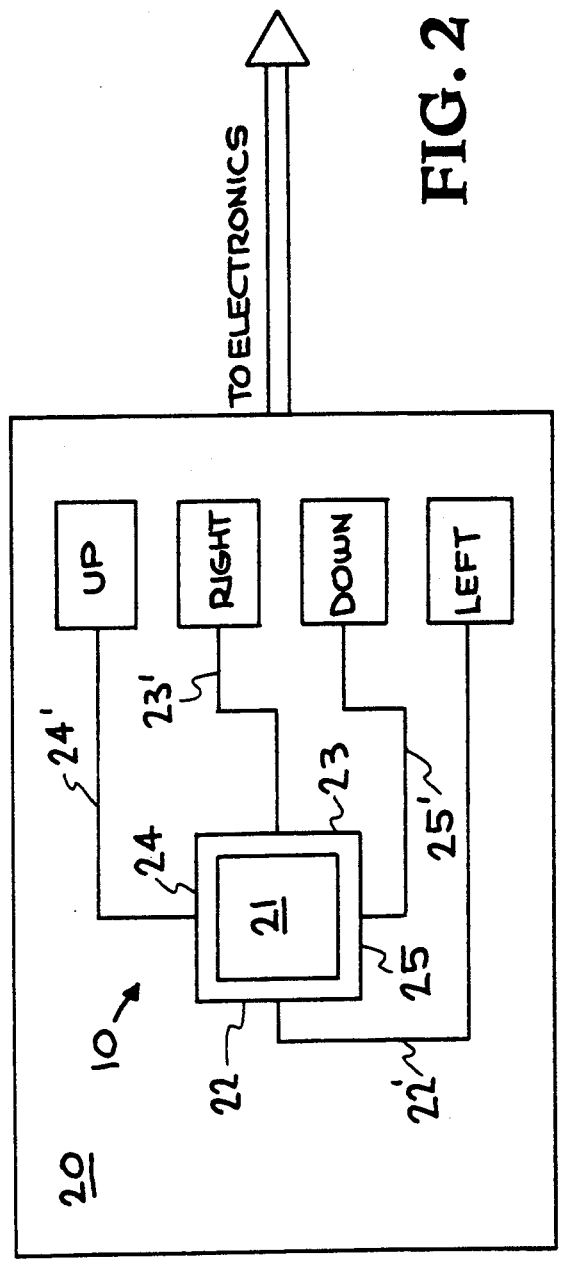
FIG. 1
FIG. 2

MICROGAP X-RAY DETECTOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The invention relates to photon detectors, particularly to x-ray photon detection, and more particularly to an x-ray detector which involves the conversion of x-ray photons into electrons (photoelectrons) and subsequent amplification of these photoelectrons via generation of electron avalanches.

Photon detectors operate by converting photons into electronic signals that can be processed into pulses or images. These include devices such as photodiodes, photomultiplier tubes, vidicons, charged-coupled devices (CCD's) and silicon detectors doped with impurities such as lithium, etc. All photon detectors are characterized by their sensitivity to photons as a function of photon energy, their ability to amplify incident photons into large electrical signals proportional to the incident photon intensity (gain), their ability to distinguish fine detail in an image (position resolution), their temporal response to incident photons (time resolution), and their inherent noise level (dark current). These prior devices are exemplified by U.S. Pat. Nos. 5,032,729 issued Jul. 16, 1991 to G. Charpak; No. 4,999,500 issued Mar. 12, 1991 to A. Breskin et al.; No. 4,896,041 issued Jan. 23, 1990 to H. Vlasbloem et al.; No. 4,859,855 issued Aug. 22, 1989 to H. Vlasbloem; No. 4,686,368 issued Aug. 11, 1987 to H. L. Anderson et al.; and No. 4,431,921 issued Feb. 14, 1984 to H. A. A. W. Filthub.

There are many applications where high efficiency and high image resolution of x-rays are important, such as x-ray microscopy and holography using incoherent and coherent sources of gamma rays and x-rays. A new field is microscopy of biological samples using x-rays and is reliant on new sources of intense x-rays available at synchrotron light sources. Traditional imaging has been accomplished using Si(Li) detectors and x-ray pinhole cameras or grazing incidence or refractive (Fresnel) optics. In a pinhole camera, the image is built up slowly by counting photons as the object is scanned across a fine x-ray beam formed by the pinhole. The process is complex and time consuming. Certain applications call for reasonable quantum efficiency of the detector at room temperature, which cannot be provided by the Si(Li) detectors which require bulky liquid nitrogen cooling systems for efficient operation.

Thus, there is a need in the field of photon detectors, for a detector capable of exhibiting photon sensitivity over a wide range of energies, has fast time response thus allowing operation at a frequency up to the Giga-Hertz level, provides adjustment gain, exhibits low noise, and has the capability to operate with reasonable quantum efficiency at room temperature. The present invention fills the above-mentioned need and provides a replacement for present-day x-ray photodetectors, such as the Si(Li) detectors, while exhibiting the fast time response typical of photomultiplier tubes, provides adjustable gain of up to about $10^9$, exhibits low noise typical of photomultiplier tubes, while operating efficiently at room temperature. Also, the present invention has the capability to perform as a position sensitive detector with position resolution similar to a CCD or Vidicon, but with a factor of 1000 times the speed of readout. The speed of the invention allows for unprecedented dynamic range of visual information, allowing for the detection of photons with high fidelity in conditions that would normally saturate CCD detector pixels. Unlike CCD detectors, the present invention is not subject to radiation damage.

SUMMARY OF THE INVENTION

It is an object of the present invention to provide an x-ray detector.

A further object of the invention is to provide a means for detecting x-ray photons over a wide range of energies.

A further object of the invention is to provide an x-ray detector which exhibits fast time response with pulse widths less than 10 nanoseconds and as fast as 1 nanosecond.

A further object of the invention is to provide an x-ray detector having adjustable gain of up to about $10^9$.

A further object of the invention is to provide an x-ray detector which exhibits low noise.

A further object of the invention is to provide an x-ray detector which operates with reasonable quantum efficiency at room temperature.

A still further object of the invention is to provide an x-ray detector having a cathode and anode geometry so as to perform as a position sensitive detector with a high speed of readout.

Another object of the invention is to provide an x-ray detector which achieves the conversion of x-ray photons into photoelectrons which are subsequently amplified through the generation of electron avalanches, with these avalanches being collected and processed.

Another object of the invention is to provide an x-ray detector which consists of a coplanar anode and cathode separated by a thin gas-filled gap subjected to a high electric potential.

Another object of the invention is to provide an x-ray detector using a cathode for converting x-ray photons into photoelectrons which are amplified via the generation of electron avalanches in a thin gas-filled region subject to a high electric potential and collected on an anode which may be a single conducting plane, a plane of resistive material, or multiple areas of conducting or resistive material.

The above objects and other objects and advantages are carried out by an x-ray detector having a cathode and an anode separated by a thin gas-filled gap with a dimension, D, and having a high electrical potential, V, applied between the anode and the cathode to provide an electric field, E, that is equal to the electric potential divided by the gap dimension, $E=V/D$. The cathode consists of a material which emits electrons when x-ray photons are incident upon it, such emitted electrons are known as photoelectrons. The emitted photoelectrons are directed into the thin gas-filled gap and accelerated in the high electric field toward the anode creating an electron avalanche formed by electron collisions in the gas atoms so as to create additional electrons, the electron avalanche being collected by the anode and detected thereon by a charge sensing pre-amplifier, which converts the charge pulse into a current or voltage pulse that can be read using standard electronic circuitry. The anode can be a single conducting plane, or a plane of resistive material, or multiple areas of conducting or resistive material. The type of anode construction would depend on the specific application for the detector. For example, when resistive materials are used for the anode, such as in an x-ray camera, the charge collected from an electron avalanche can be divided between the ends and/or sides of the resistive material to provide information corresponding to the position of the avalanche; and when a single plane of conductive material is used for the anode the charge from the avalanche is collected independent of the position of the avalanche, and thus is analogous to a photomultiplier tube or photodiode.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 1 is a schematic view of an embodiment of an x-ray detector utilizing a resistive anode in accordance with the invention.

FIG. 2 illustrates a resistive anode layout for the x-ray detector of the invention illustrated in FIG. 1.

DETAILED DESCRIPTION OF THE INVENTION

Figure 3:
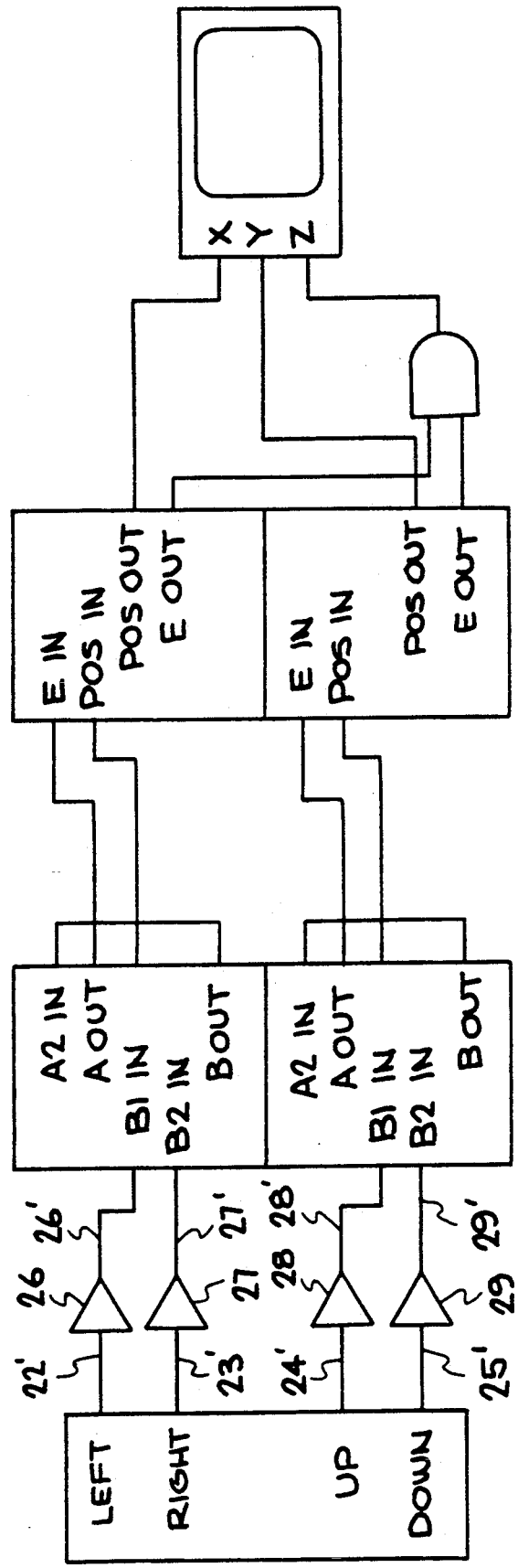
FIG. 3 is a schematic illustration of processing electronics for the resistive anode layout of FIG. 2 when incorporated into an x-ray camera.

The present invention is directed to an x-ray detector which operates by converting photons into electronic signals that can be processed into pulses or images. The invention is referred to hereinafter as a microgap x-ray detector, which when embodied as illustrated in FIGS. 1-3 converts x-ray photons into signals that are processed by electronics into images displayed on an oscilloscope of an x-ray camera, which is referred to as a microgap x-ray camera, due to the construction and operation of thin gas-filled gap (microgap) between the cathode and anode of the detector as described here below.

Basically, the microgap x-ray detector of this invention achieves the conversion of x-ray photons into electrons (photoelectrons) and subsequent amplification of these photoelectrons through the generation of electron avalanches in a thin gas-filled region or gap between the cathode (photocathode) and the anode which is subject to a high electric potential applied between the anode and the cathode, the electron avalanches are detected on the anode with a charge sensing pre-amplifier which converts the charge pulse into a current or voltage pulse that can be read using standard electronic circuitry. Depending on the construction of the anode, the x-ray detector, for example, can be utilized for producing images on an oscilloscope, or as a photon counter analogous to a photomultiplier tube or photodiode, or as a position sensing or non-position sensing x-ray detector.

As shown in FIG. 1, the microgap x-ray detector of this invention in its simplest form consists of a coplanar anode generally indicated at 10 and cathode (photocathode) generally indicated at 11 separated by a thin gas-filled gap or region 12 which is subject to a high electric potential producing an electric field 13. Anode 10 and cathode 11 are electrically connected to an appropriate power source 14, as indicated by the dash lines to power source or supply 14 for producing electric field 13. By way of example the gap or region 12 has a width or dimension, D, of 100 microns, and the electric potential, V, is of 500 volts. The electric potential, V, is applied between the anode 10 and cathode 11 to provide an electric field, E, indicated at 13, that is equal to the electric potential divided by the gap dimension, $E = V/D$. The gap dimension and electric potential are chosen in order to provide an electric field of the order of $10^6$ volts per meter. Thus, a gap of 100 microns ($10^{-4}$ m) and an electric potential of 500 volts gives an electric field, $E = 500$ volts/$10^{-4}$ m $= 5 \times 10^6$ volts/meter. The gap 12 may have a range of 5 to 1000 microns, with the electric potential having a range of 100 to 5000 volts. While the electric field 13 extends throughout gap 12, it is illustrated in FIG. 1 only at the ends of gap or region 12 for simplicity. The gap 12 contains a gas, indicated by legend, which for example is a 90%-argon/10%-methane mixture, known as P-10 gas, but may consist of other mixtures such as argon/isobutane/-FREON/methane, for example, 70% argon/23% isobutane/3% FREON 13B1/4% dimothoxie methane, and at a pressure of 0.1 atm to 2 atm. FREON, which is a halogenated hydrocarbon and is one of a group of polyhalogenated deriviatives of methane and ethane containing fluorine and, in most cases, chlorine or bromine.

The cathode (photocathode) 11 consists of a material having a property that emits electrons when photons indicated at 15 are incident upon it. Cathodes of this type are called photocathodes and the emitted electrons indicated at 16 are called photoelectrons. Photocathodes sensitive to gamma or x radiation can be fabricated using a thin layer or window 17 of low atomic number, such as beryllium having a thickness of 0.5 mm to 2 mm, and coated with a layer 18 of high atomic number, such as gold having a thickness of 100 Å to 500 Å. Photocathodes sensitive to ultra-violet, visible and infrared light consists of windows coated with materials such as yttrium, cesium, sodium or combinations of other rare earth elements.

The window 17 of photocathode 11 may also be composed of beryllium, thin quartz, glass and plastics such as MYLAR is a plastic (polyester film) made by E. I. Du Pont and Co., for example, and the layer 18 may also be composed of cesium iodide, cesium, yttrium, chromium, tantalum and tungsten, for example, when the detector of FIG. 1 is constructed for x-ray sensitivity, such as when 8 keV x-ray photons 15 impinge thereon. The window 17 may also be coated with a thin protective film of boron, boron carbide, or carbon to prevent damage to the photocathode.

When a photoelectron 16 is ejected out of the photocathode 11 and into the thin gas-filled gap or region 12 it is accelerated in the extremely high electric field 13 towards the anode 10. The accelerating electron 16 collides with other electrons in the gas atoms in gap 12 to create additional electrons, and so on, until an electron avalanche indicated at 19 is formed, as shown schematically in FIG. 1. The electron avalanche 19 can best be thought of as a sort of electron chain reaction. Under the proper choices of gas type, and pressure, and electric field, gains of $10^6$ or more can be achieved by the time the avalanche 19 reaches the anode 10. The avalanche 19 is detected on the anode 10 with a charge sensing pre-amplifier (see FIG. 3), which converts the charge pulse into a current or voltage pulse that can be read using standard electronic circuitry.

The anode 10 as illustrated in FIG. 1, and seen in greater detail in FIG. 2, is a composed of a substrate 20 constructed of glass, for example, with a thickness of 0.5 mm to 2 mm, on which is deposited a coating 21 of resistive material composed of 38% chromium, 62% silicon monoxide, for example, with a thickness of 500 Å to 1000 Å. As shown in FIGS. 1 and 2, the resistive coating 21 is of a 2 mm×2 mm configuration having a thickness of 1000 Å. Other configurations such as 100 $\mu$m×100 $\mu$m or 10 mm×10 mm or larger depending on the desired position resolution and field of view. The resistive coating 21, for x-ray detection, may also be composed, for example, of carbon and tantalum oxide. The anode 10 can be a single conducting plane, or a plane of resistive material, see FIG. 2, or multiple areas of conducting or resistive material, with the conductive materials being composed of gold, aluminum and copper, for example. When resistive materials are used for the anode, which is the case for the detector application in a microgap x-ray camera, see FIG. 3, the charge collected from an electron avalanche can be divided between the ends of the resistive material (in the case of a linear anode) or the sides of the resistive material (in the case of a square anode), see FIG. 2, to provide information corresponding to the position of the avalanche. When a single anode plane of conductive material is used for the anode, the charge from the avalanche is collected independent of the position of the avalanche. This is the case of a photon counter analogous to a photomultiplier tube or photodiode. When multiple anodes consisting of areas of conductive material laid out in an area and read out independently of each other is used, the individual avalanches can be read on individual anodes giving position information corresponding to the anode position. While not shown in FIG. 1 the detector includes means for detecting a charge pulse on the anode produced by the electron avalanche and converting that charge pulse into a current or voltage output signal.

Referring now to FIGS. 2 and 3, the anode 10 is 2 mm square and the charge collected from the avalanche 19 of FIG. 1 is divided between the sides indicated at 22, 23, 24 and 25 of resistive material 21 and these charges, indicated at 22', 23', 24' and 25' are respectively detected by a plurality of charge sensing pre-amplifiers 26, 27, 28 and 29, see FIG. 3, which corresponds to the position of the avalanche, be it left, right, up, or down, as shown by legends in FIGS. 2 and 3. The pre-amplifiers 26-29 convert the charge pulses 22-25 into current or voltage pulses 26'-29' which are directed to an oscilloscope via conventional electronic circuitry, such as schematically illustrated in FIG. 3. Inasmuch as the details of the microgap x-ray camera of FIGS. 2 and 3 do not constitute part of this invention, and are illustrated to set forth the operation of an embodiment of the anode of the microgap x-ray detector of this invention, further and detailed description of FIGS. 2 and 3 are deemed unnecessary. As pointed out above, the anode 10 of the detector of FIG. 1 may be of different configurations and compositions, and the specific illustrated application for and configuration of the anode is not intended to limit it to the illustrated embodiment.

However, it is pointed out that the microgap x-ray camera of FIG. 3 has the capability of exhibiting photon sensitivity over a wide range of energies, depending on the choice of photocathode materials, from gamma ray energies up to a few million electron volts, MeV, to low energy x-rays with energies greater than about 500 electron volts, eV, spanning a range of about $10^4$ eV. Also, the x-ray detector of FIG. 1, with appropriate anode configuration and composition, exhibits the fast time response typical of photomultiplier tubes, with pulse widths less than 10 nanoseconds (ns) and as fast as 1 ns thus allowing it to operate with frequency response up to the gigahertz (GHz) level. The detector also has the capability, when anode 10 and photocathode 11 are properly constructed, of providing adjustable gain of up to about $10^9$ depending on the choice of fill-gas electric potential, and gas pressure. In addition, the detector exhibits low noise, typical of photomultiplier tube. Further, the detector of this invention operates with reasonable quantum efficiency at room temperature without the cooling systems required in Si(Li) detectors.

Suitable choices of photocathode and anode geometry allow the detection of this invention to perform as a position sensitive detector, with position resolution similar to a CCD or vidicon, but with a factor of 1000 times the speed of readout. The speed of this detector allows for unprecedented dynamic range of visual information, allowing for the detection of photons with high fidelity in conditions that would normally saturate CCD detector pixels. This dynamic range enhancement can be achieved through a combination of the inherent time response of the detector and the application of fast electronics to read out individual anode elements in a parallel manner. Also, because of the simplicity of the detector of this invention, it is not subject to x-ray or ionization radiation damage and has very low sensitivity to spurious noise induced by background charged and neutral particle radiation.

The microgap photon detector of this invention can be fabricated for various applications including position sensing and non-position sensing of x-rays and ultra-violet (UV) radiation. The application of the x-ray position sensing detector can be for x-ray imaging of microscopic samples using x-ray sources and reflecting or refracting x-ray optics. The detector also has application for x-ray imaging of biological samples and holographic imaging. UV sensitive versions of the detector can be used to detect emissions from combustion products, for examples, from rocket plumes. Additional applications for the detector is in scintillation counters and imaging detectors for fiber optic bundles.

When the microgap detector of the present invention is used as an x-ray camera, such as illustrated in FIG. 3, it can be used in any application where high efficiency and high image resolution of x-rays are important, such as in x-ray microscopy and holography using incoherent and coherent sources of gamma rays and x-rays. Also, position sensitive microgap x-ray camera eliminates the need to scan the object, as required by a pinhole camera, and because of its superior quantum efficiency it reduces the time required to produce an image. The x-ray camera incorporating the microgap x-ray detector of the present invention will find use in any application or system where the efficient detection of x-rays and gamma rays is necessary. In addition, an x-ray camera utilizing this invention can be used in applications requiring resolving of images with highly variable light levels, such as in astronomy and high energy astrophysics; as well as for extremely low light level sensitivity television camera.

It is thus seen that the microgap detector of this invention has wide applications in various fields and can be simply modified by changing the configuration and-/or composition of the anode, the geometry and composition of the cathode, the composition and pressure of the gas in the space between the anode and cathode, and/or the electric potential applied between the anode and the cathode.

While a specific embodiment of the microgap x-ray detector of the present invention has been illustrated in FIG. 1 for incorporation in an x-ray camera, illustrated in FIGS. 2 and 3, it has been pointed out above that modifications and changes of the illustrated embodiment are within the scope of this invention. Other modifications and changes will become apparent to those skilled in the art. Any limitation on the scope of this invention is not intended by the embodiments illustrated and/or specific configurations, materials, geometries, etc. described above, and the invention is only to be limited by the scope of the appended claims.

We claim:

1. A microgap photon detector comprising:
a coplanar anode and cathode, said anode and said cathode being separated to form a gap therebetween, said gap having a width of 5-1000 microns, said cathode being composed of a layer of low atomic number material forming a window and a layer of high atomic number material which emits electrons when photons are incident upon it;
said layer of high atomic number material being in contact with said layer of low atomic number material;
a gas filling said gap between said anode and said cathode;
means for applying an electric potential between said anode and said cathode to produce a single electric field in said gap; and
means connected directly to said anode for converting charge pulses on said anode to output pulses, whereby photons incident upon said cathode cause electrons to be emitted therefrom into said gas-filled gaps which are accelerated in the single electric field towards said anode causing collisions with other electrons in gas atoms of said gas to create an electron avalanche which results in charged pulses collected by said anode, with said charged pulses being converted to output pulses.

2. The photon detector of claim 1, wherein said gap defines a dimension, D, and said electrical potential, V, is applied between said anode and said cathode such that said electric field, E, is equal to the electric potential divided by the gap dimension, $E=V/D$, and wherein said gap dimension and said electric potential provide an electric field of the order of $10^6$ volts per meter.

3. The photon detector of claim 1, wherein said low atomic number material of said cathode is selected from the group consisting of beryllium, aluminum, quartz, glass and plastic; and wherein said high atomic number material of said cathode is selected from the group consisting of gold, cesium, yttrium, cesium iodide, chromium, tantalum and tungsten.

4. The photon detector of claim 1, wherein said low atomic number material is beryllium and said high atomic number material is gold.

5. The photon detector of claim 4, wherein said gas is composed of 90% argon/10% methane or 70% argon/23% isobutane/3% freon 13B1/4% dimothoxie methane.

6. The photon detector of claim 5, wherein said gap has a width of 100 microns, and wherein said electric potential is 500 volts.

7. The photon detector of claim 1, wherein said gas is selected from the group consisting of 90% argon/10% methane, argon/isobutane/freon 13B1/dimothoxie methane, and wherein said gas mixtures of argon/isobutane of various ratios, and is at a pressure in the range of 0.1 atm to 2 atm.

8. The photon detector of claim 1, wherein said anode is composed of at least a substrate and a layer of resistive material secured to said substrate and is selected from the group of chromium/silicon monoxide, tantalum oxide, and carbon.

9. The photon detector of claim 1, wherein said anode includes a layer of resistive material composed of about 38% chromium and 62% silicon monoxide.

10. The photon detector of claim 9, wherein said means for converting charge pulses on said anode to output pulses includes at least one charge sensing pre-amplifier.

11. The photon detector of claim 1, wherein said anode includes at least a substrate and a layer of material selected from a group of conducting and resistive materials, said conducting material being selected from the group consisting of gold, aluminum, and copper and said resistive materials being selected from the group consisting of chromium/silicon monoxide, tantalum oxide and carbon.

12. The photon detector of claim 11, wherein said anode includes at least said substrate and a layer of material selected from the group of a single conducting plane, a plane of resistive material, multiple areas conducting material, and multiple areas of resistive material.

13. The photon detector of claim 1, wherein said means for converting charge pulses on said anode to output pulses includes at least one charge sensing pre-amplifier which detects an electron avalanche on said anode.

14. The photon detector of claim 1, wherein said window is coated with a film of material selected from the group of boron, boron carbide, and carbon.

15. The photon detector of claim 1, wherein said anode is a resistive anode having four sides, and wherein said means for converting charge pulses on said anode to output pulses includes a plurality of preamplifiers, each of said preamplifiers being connected directly to one of said four sides of said anode, and each of said plurality of preamplifiers being connected to electronics capable of decoding x and y positions of an electron avalanche produced in said gap between said cathode and said anode.

16. The photon detector of claim 15, wherein said anode is composed of a layer of chromium and silicon monoxide deposited on a substrate.

17. The photon detector of claim 16, wherein said layer of chromium and silicon monoxide is of a square configuration.

18. A single stage microgap x-ray detector comprising:
a cathode composed of at least a layer of low atomic number material and a layer of high atomic number material in contact with said layer of low atomic number material;
an anode positioned is spaced relation to said cathode to form a single gap therebetween and including at least a substrate and at least one area having a layer of material selected from the group of conducting and resistive materials;
said single gap between said cathode and said anode containing a gas;

means for producing a single electric field in said gap; and means for detecting an electron charge on said anode and converting said electron charge to an output pulse.

19. The microgap x-ray detector of claim 18, wherein said layer of low atomic number material is selected from the group consisting of beryllium, aluminum, glass, quartz and plastic, wherein said layer of high atomic number material is selected from the group consisting of gold, cesium, yttrium, cesium oxide, chromium, tantalum and tungsten.

20. The microgap x-ray detector of claim 18, wherein said conductive material is selected from the group of gold, aluminum and copper, and the resistive material is selected from the group of chromium/silicon monoxide, tantalum oxide and carbon.

21. The microgap x-ray detector of claim 18, wherein said gap has a width of 5 to 1000 microns, and wherein said means for producing said electric includes a power supply producing an electrical potential in the range of 100 to 5000 volts.

22. The microgap x-ray detector of claim 18, wherein said means for detecting an electron charge and converting said to an output pulse includes at least one charge sensing pre-amplifier.

23. The microgap x-ray detector of claim 18, wherein said layer of low atomic number material is composed of beryllium, said layer of high atomic number material is composed of gold, said anode includes at least one area of resistive material, said gap having a width of about 100 microns, said electric field being produced by a potential of about 500 volts applied between said anode and said cathode, and said means for detecting an electron charge on said anode and converting same to an output pulse includes a charge sensing pre-amplifier.

24. The microgap x-ray detector of claim 23, wherein said gas in said gap is at a pressure of 0.1 atm to 2 atm, and is selected from the group of 90% argon/10% methane, and argon/isobutane in various ratios, and wherein said resistive material is composed of material selected from chromium/silicon monoxide, tantalum oxide, and carbon.

25. The microgap x-ray detector of claim 24, wherein said gas is composed of 90% argon/10% methane at a pressure of 1 atm, and said resistive material is composed of 32% chromium/68% silicon monoxide.

26. The microgap x-ray detector of claim 18, wherein said anode is composed of resistive material and having four sides, and wherein said means for detecting an electron charge on said anode and converting said electron charge to an output pulse includes a plurality of preamplifiers, each one of said plurality of preamplifiers being connected directly to one of said sides of said anode.

27. The microgap x-ray detector of claim 26, wherein said anode sides form a square, and wherein each of said preamplifiers is connected to one of said four sides of said anode by a conductive member, such the charge collected on each of said four sides of said anode can be compared by said means for detecting and converting output pulses to electron charges on said anode.

* * * * *